United States Patent
Brakeville et al.

(10) Patent No.: US 11,310,234 B2
(45) Date of Patent: Apr. 19, 2022

(54) SECURING PERMISSIONED BLOCKCHAIN NETWORK FROM PSEUDOSPOOFING NETWORK ATTACKS

(71) Applicant: International Business Machines Corporation, Armonk, NY (US)

(72) Inventors: Sloane Brakeville, Austin, TX (US); Nitin Gaur, Roundrock, TX (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/814,801

(22) Filed: Nov. 16, 2017

(65) Prior Publication Data

US 2019/0149550 A1    May 16, 2019

(51) Int. Cl.
| | |
|---|---|
| G06F 21/62 | (2013.01) |
| H04W 12/00 | (2021.01) |
| H04L 9/32 | (2006.01) |
| H04L 9/06 | (2006.01) |
| G06F 21/60 | (2013.01) |
| H04L 29/06 | (2006.01) |
| H04L 9/40 | (2022.01) |

(52) U.S. Cl.
CPC .......... H04L 63/101 (2013.01); G06F 21/604 (2013.01); G06F 21/62 (2013.01); H04L 9/3226 (2013.01); H04L 9/3239 (2013.01); H04L 9/3268 (2013.01); H04L 63/08 (2013.01); H04L 63/12 (2013.01); H04L 63/14 (2013.01); H04W 12/00 (2013.01); H04L 9/06 (2013.01); H04L 2209/38 (2013.01)

(58) Field of Classification Search
CPC ....... H04L 63/101; H04L 63/08; H04L 63/12; H04L 63/14; H04L 9/3226; H04L 9/3239; H04L 9/3268; H04L 9/06; H04L 2209/38; G06F 21/604; G06F 21/62; H04W 12/00
See application file for complete search history.

(56) References Cited

U.S. PATENT DOCUMENTS

| | | | |
|---|---|---|---|
| 8,850,043 B2 * | 9/2014 | Rodriguez | H04L 63/105 |
| | | | 709/229 |
| 9,313,221 B2 | 4/2016 | Black et al. | |
| 9,569,771 B2 | 2/2017 | Lesavich et al. | |
| 9,578,057 B1 | 2/2017 | Spertus | |
| 9,608,829 B2 | 3/2017 | Spanos et al. | |
| 9,635,000 B1 * | 4/2017 | Muftic | H04L 9/14 |

(Continued)

OTHER PUBLICATIONS

Arnaud Le Hors, Hyperledger and Fabric v1, HorsSenior Technical Staff Member Web & BlockchainOpen Technologies, IBM, Member of the HyperledgerTechnical Steering Committee Contributor to Hyperledger Fabric May 23, 2017.

(Continued)

*Primary Examiner* — Fatoumata Traore
*Assistant Examiner* — Thanh H Le (57) ABSTRACT

An example operation may include one or more of identifying a new block to be created for a blockchain via a new block creation cycle, executing chaincode stored in the blockchain, identifying one or more credentials assigned as one credential per registered member organization of the blockchain based on the chaincode, validating the one or more credentials and determining consensus is satisfied via a consensus service, and creating the new block responsive to the consensus being satisfied.

17 Claims, 8 Drawing Sheets

(56) References Cited

U.S. PATENT DOCUMENTS

| | | | |
|---|---|---|---|
| 9,667,427 B2* | 5/2017 | Oberhauser | H04L 9/3247 |
| 9,699,151 B2 | 7/2017 | Martini | |
| 2010/0235625 A1 | 9/2010 | Pandey | |
| 2016/0028552 A1* | 1/2016 | Spanos | H04L 9/3297 |
| | | | 713/178 |
| 2017/0033932 A1 | 2/2017 | Truu et al. | |
| 2017/0034197 A1 | 2/2017 | Daniel et al. | |
| 2017/0046651 A1* | 2/2017 | Lin | G06Q 20/367 |
| 2017/0046652 A1* | 2/2017 | Haldenby | G06Q 20/0655 |
| 2017/0075941 A1* | 3/2017 | Finlow-Bates | H04L 9/3239 |
| 2017/0116693 A1 | 4/2017 | Rae | |
| 2017/0140375 A1 | 5/2017 | Kunstel | |
| 2017/0147808 A1* | 5/2017 | Kravitz | G06F 21/45 |
| 2017/0149819 A1* | 5/2017 | Androulaki | H04L 63/123 |
| 2017/0155515 A1* | 6/2017 | Androulaki | G06F 21/64 |
| 2018/0137512 A1* | 5/2018 | Georgiadis | H04L 63/126 |
| 2018/0225661 A1* | 8/2018 | Russinovich | G06F 21/57 |

OTHER PUBLICATIONS

Andreas Ellervee, A Reference Model for Blockchain-Based Distributed Ledger Technology, University of Tartu, Institute of Computer Science Software Engineering Curriculum, 2017, Master's Thesis.

Mitar Milutinovic et al., Proof of Luck: an Efficient Blockchain Consensus Protocol Mar. 16, 2017.

Thomas Hardjono et al., Anonymous Identities for Permissioned Blockchains, Draft v05—Jan. 20, 2016.

* cited by examiner

SECURING PERMISSIONED BLOCKCHAIN NETWORK FROM PSEUDOSPOOFING NETWORK ATTACKS

TECHNICAL FIELD

This application generally relates to transaction/block consensus on a blockchain, and more particularly, securing permissioned blockchain network from pseudospoofing network attacks.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

In many use cases blockchains have begun a transition from the public models that backup cryptocurrency to a secured (permissioned) and specialized network for customized purposes. This transition provides entirely new considerations for security, consensus models, and architecture. With a large amount of activity originating from the business sector into the permissioned networks model, companies are starting to examine methods for which they can operate shared blockchain-based applications in ways that are profitable and secure.

Every blockchain and distributed system includes a protocol for achieving a shared agreement about a state of the network. Achieving 'consensus' among the peers, in general, is a communication problem dating back to the academic study of the Byzantine General's problem. Modern technological schemes include Byzantine fault tolerance (BFT) and certain variants as well as a proof-of-work (PoW) and proof-of-take (PoS) made popular by BITCOIN and the other cryptocurrency models and their respective protocols. Many permissioned networks use BFT and its variants due to the optimal speed of consensus. In permissioned networks, voting during consensus must be properly managed. Too much authority provided to one organization on the network leads to decreased security in the entire network. For example, in a distributed blockchain ledger managed by a network of eight institutions, the ability of one malicious institution node to identify multiple validating peers and influence the shared ledger is made easy by the current infrastructure models. Without a proper control mechanism, the smaller permissioned networks are at a larger risk of malicious behavior. Additionally, members of the permissioned networks may desire multiple redundant nodes in case of a failure, while still maintaining a small consensus footprint to ensure network processing speeds. In this case, a member may inadvertently be controlling too much voting power by having backup nodes. The vulnerability of permissioned networks creating unauthorized validating nodes to gain voting power is well understood in the public network space. This vulnerability of creating multiple perceived unique identities by a single entity to gain control is referred to as a Sybil attack.

SUMMARY

One example embodiment may provide a method that includes one or more of identifying a new block to be created for a blockchain via a new block creation cycle, executing chaincode stored in the blockchain, identifying one or more credentials assigned as one credential per registered member organization of the blockchain based on the chaincode, validating the one or more credentials and determining consensus is satisfied via a consensus service, and creating the new block responsive to the consensus being satisfied.

Another example embodiment may include an apparatus that includes a processor configured to perform one or more of identify a new block to be created for a blockchain via a new block creation cycle, execute chaincode stored in the blockchain, identify one or more credentials assigned as one credential per registered member organization of the blockchain based on the chaincode, validate the one or more credentials and determining consensus is satisfied via a consensus service, and create the new block responsive to the consensus being satisfied.

Still another example embodiment may provide a non-transitory computer readable storage medium configured to perform one or more of identifying a new block to be created for a blockchain via a new block creation cycle, executing chaincode stored in the blockchain, identifying one or more credentials assigned as one credential per registered member organization of the blockchain based on the chaincode, validating the one or more credentials and determining consensus is satisfied via a consensus service, and creating the new block responsive to the consensus being satisfied.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to transaction/block consensus on a blockchain, and in another embodiment relates to consensus applied during transaction/block commitment via rules and validation for securing a permissioned blockchain network from pseudospoofing network attacks.

According to example embodiments, to remediate the issue of pseudospoofing (forgery of identity), members in a permissioned network or blockchain may agree to a set of governing rules defined in replicated chaincode of the blockchain, which can be retrieved and executed to perform rule enforcement for block creation and other related blockchain activities. This chaincode may be accessed and executed during each round of block creation with particular governing rules defined by the chaincode. The membership service which validates the credentials of nodes in the network may perform a series of checks based on the most recent version of the governing chaincode. The chaincode can stipulate an access control list (ACL) that is referenced by the governing chaincode for each block-creation round. Within the ACL, the membership service will maintain an authorized list of nodes associated with a single entity in the network. When the credentials of a node for the permissioned entity is presented, the chaincode will reference the ACL, receive a pass or fail for that credential, and proceed to gather the credentials of the other entities to complete the block-creation round. Once the pre-defined number of credentials are received by the chaincode, consensus is undergone and a new block is created.

Figure 1A:
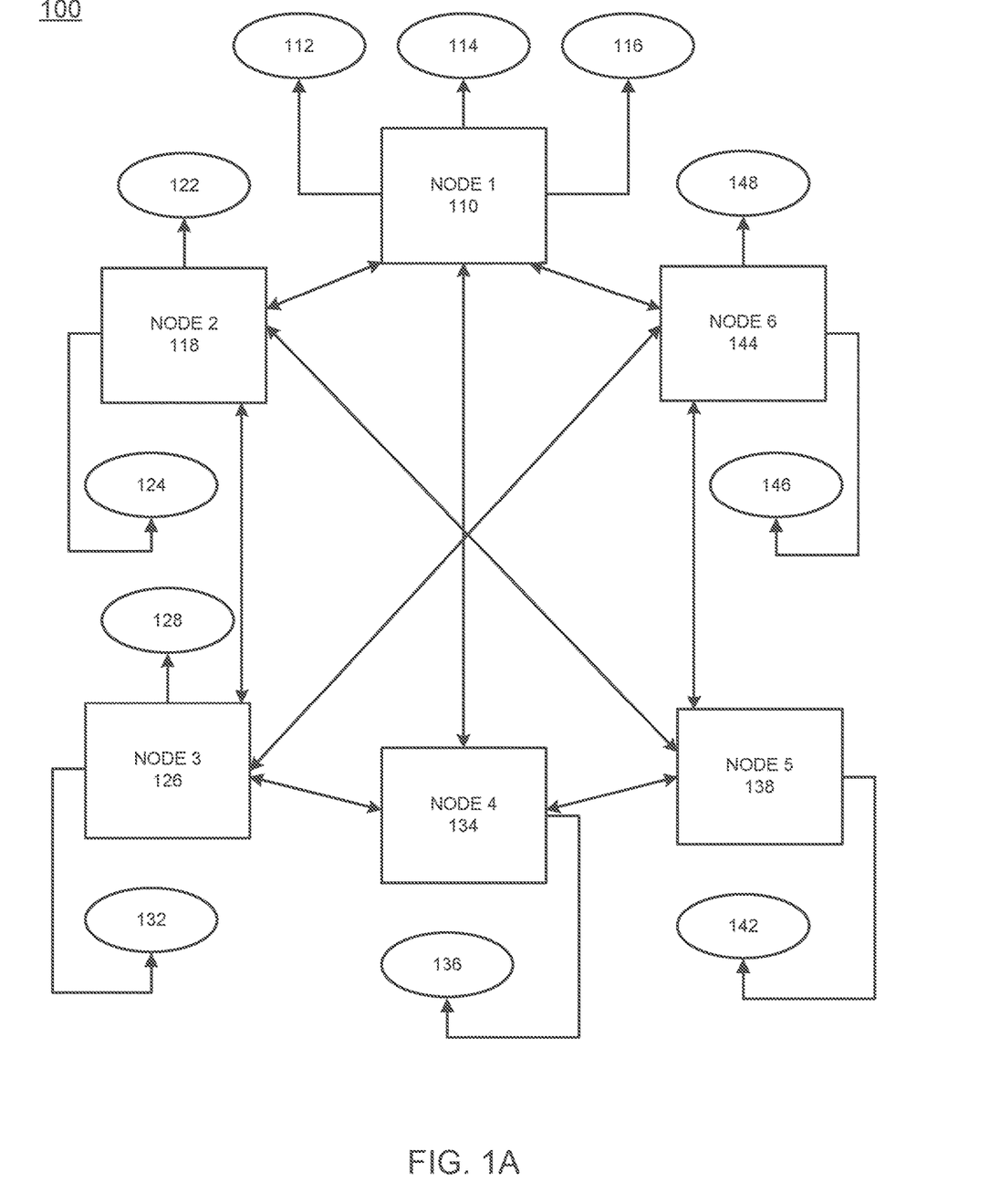
FIG. 1A illustrates a logic diagram of a permissioned network of validating nodes, according to example embodiments.

FIG. 1A illustrates a logic diagram of a permissioned network of validating nodes, according to example embodiments. For example, in this representation 100, six companies or organizations (node 1-110 through node 6-144) are members of a blockchain, and each with credentialed redundant nodes 112, 114, 116, 122, 124, 128, 132, 136, 142, 146 and 148. Some have more than one redundant node and other nodes have just one. Any configuration is possible, however, the more redundant nodes means more potential for a power imbalance with voting and consensus. With this configuration, the company controlling node 1-110 poses a risk of dominating the network through a Sybil attack due to its having the largest number of redundant nodes 112-116. As a result, each of the nodes will require block-creation rounds to undergo governance rules stipulated in the chaincode. The chaincode will include the logic that provides for an accumulation of one authorized credential per company in the network regardless of whether it is a main node or redundant node. After the credentials are accumulated and verified by the chaincode, each peer will communicate with the representative node and undergo the block-creation round. No unexpected or unfair voting may occur since each organization is limited to one or a set number of credentials. The likelihood of pseudospoofing in the permissioned blockchain network will be thwarted by known and required inherent credentials or 'voting tokens'. For instance, by providing a set number of tokens per verified entity, the network can be confident that even attempts to duplicate a validating peer, which participates in a consensus, will be ineffective at achieving a larger voting percentage.

In operation, members of a permissioned blockchain network may agree to a set of governing rules defined in replicated chaincode, which may be considered executable software instructions used to create rules and policies. The chaincode is executed during each round of block creation and/or via any attempt to perform an action requiring consensus with particular governing rules in place. A membership service which validates the credentials of nodes in the network performs a series of checks based on the most recent version of the governing chaincode. This chaincode can stipulate an access control list (ACL) that is referenced by the governing chaincode for each block-creation round. Within the ACL, the membership service will maintain an authorized list of nodes associated to a single entity in the network. When the credentials of a node for the permissioned entity is presented, the chaincode will reference the ACL, receive a pass or fail for that credential, and proceed to gather the credentials of the other entities to complete the block-creation round without accepting more than one credential per established credentials. Once the pre-defined number of credentials are received by the chaincode, consensus may be performed by a vote or decision process and a new block is created assuming the consensus is positive, affirmative and/or agreeable.

Figure 1B:
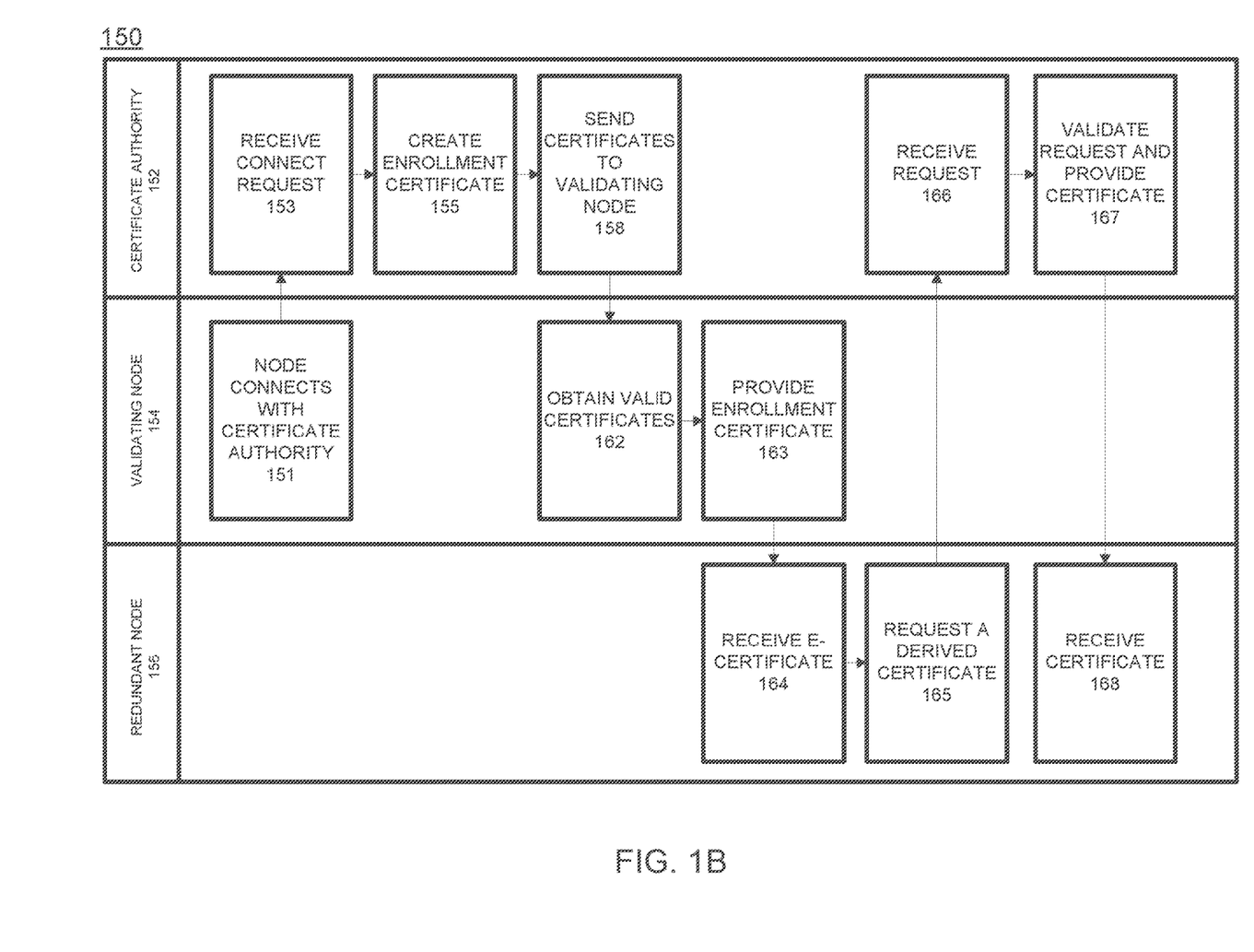
FIG. 1B illustrates a logic flow diagram of registering nodes with a membership service, according to example embodiments.

FIG. 1B illustrates a logic flow diagram of registering nodes with a membership service, according to example embodiments. Referring to FIG. 1B, the process 150 provides that a redundant node 156, a validating node 154 and a certificate authority 152 may operate together to register a node as a potential candidate for using the credential and participating in a chaincode mandated consensus procedure. For example, the validating node 154 may connect and register with a certificate authority 151, and the certificate authority 152 may receive a connection request 153 and create an enrollment certificate 155, which is sent 158 to the validating node 154. The valid certificates may be obtained 162 and an enrollment certificate 163 may be created and provided to a redundant node 156 to enable that node as a participant as well. The e-certificate is received 164 and a request for a derived certificate 165 may be performed and sent to the authority 152, which receives 166 and validates that request 167 to enable the redundant node to participate in the membership services processes 168.

Figure 1C:
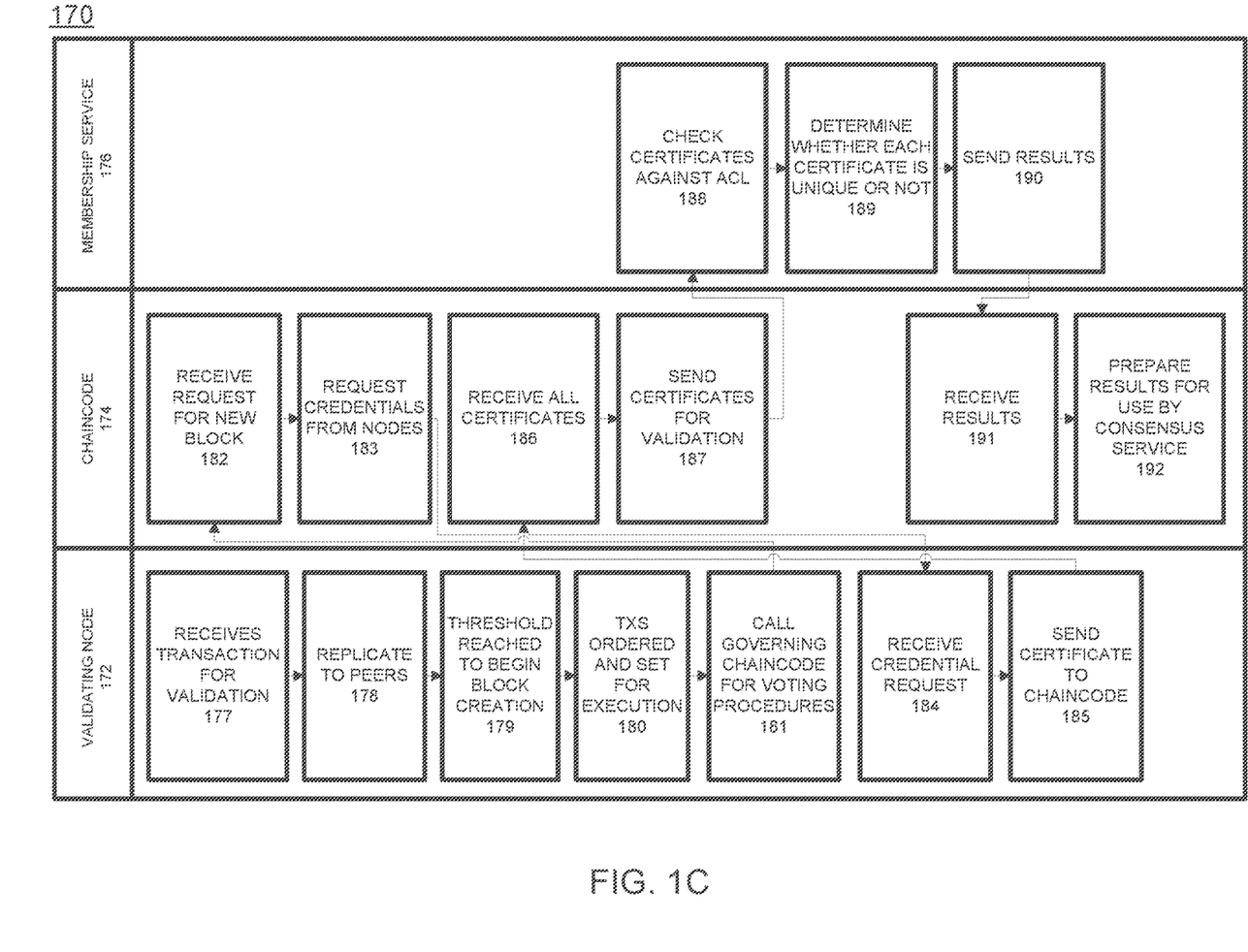
FIG. 1C illustrates a logic diagram of block creation procedure, according to example embodiments.

FIG. 1C illustrates a logic diagram of block creation procedure, according to example embodiments. Referring to FIG. 1C, the example configuration 170 provides a validating node 172, chaincode 174, and a membership service 176. The process proceeds by receiving a new potential blockchain transaction for validation 177, the information is replicated to other known peers 178, at some point a threshold is reached to begin block creation 179 and transactions are ordered and set for execution 180 and a call for governing chaincode can then be performed 181. The chaincode 174 may execute and receive the new block/transaction 182, request credentials from all necessary nodes 183, and the validating node may receive the credential request 184 and send the certificate to the chaincode function 185, which receives all certificates 186 and sends them for validation 187 to the membership service 176, which checks the certificates against an updated ACL 188. Any matches or non-matches and any duplication must be identified 189 prior to sending the results 190 to the chaincode for final execution, which receives the results 191 and prepares the results for a consensus decision 192.

Figure 2:
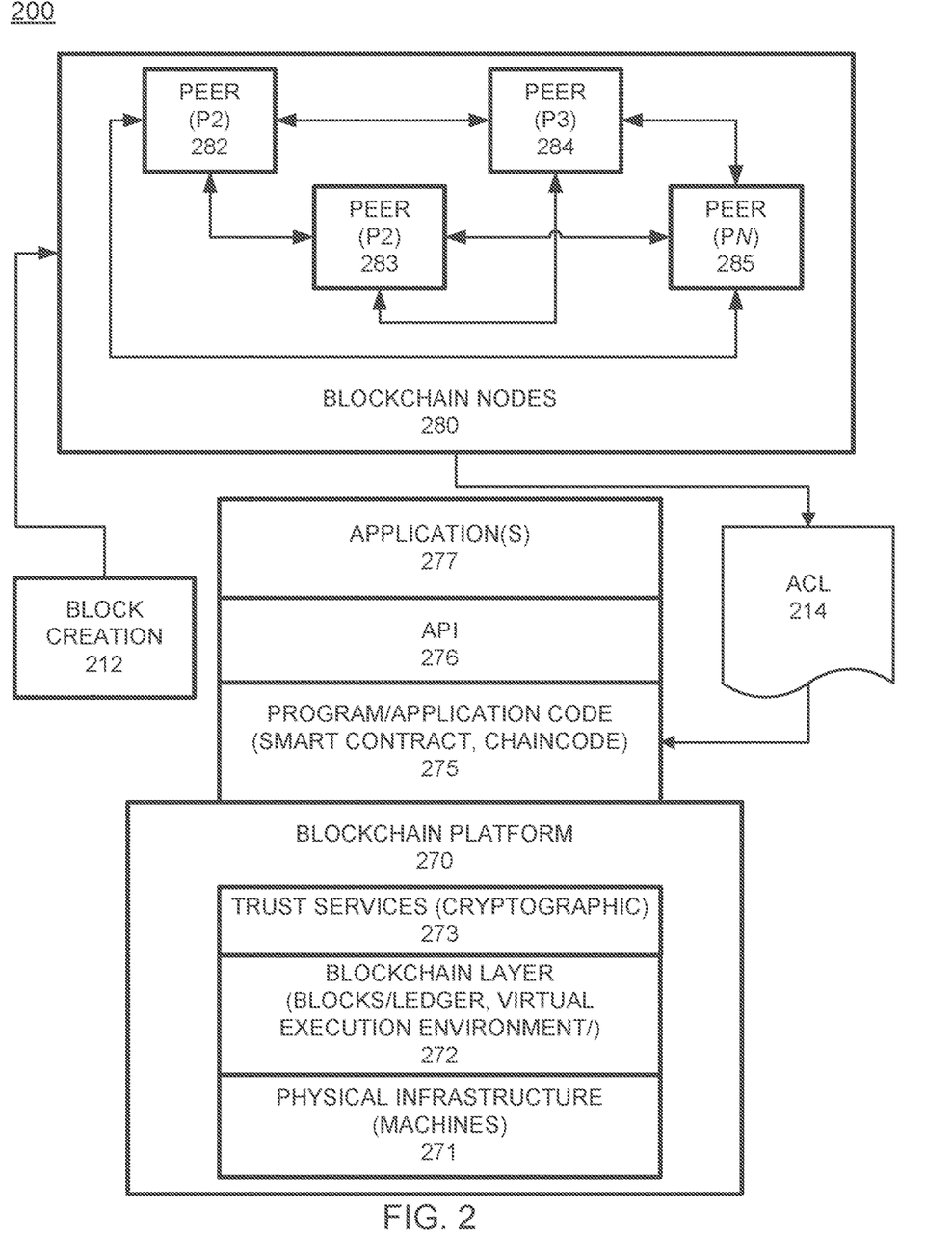
FIG. 2 illustrates an example blockchain configuration for performing blockchain block creation management, according to example embodiments.

FIG. 2 illustrates an example blockchain configuration for performing block creation and consensus management, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a new transaction/block 212 may be identified as needing to be created by the peer nodes 280. The nodes may identify an ACL list 214 for reference purposes based on the chaincode 275 and then at some point reach consensus and permit the block/transaction to be created/committed to the blockchain ledger 272 provided that certain conditions are satisfied. For example, the transaction may require a key-value pair via the consensus service to in order to be approved by consensus peers. In this case, the peers may call chaincode to establish the voting procedures, which ensures the certificates are received and no pseudospoofing can occur.

Figure 3:
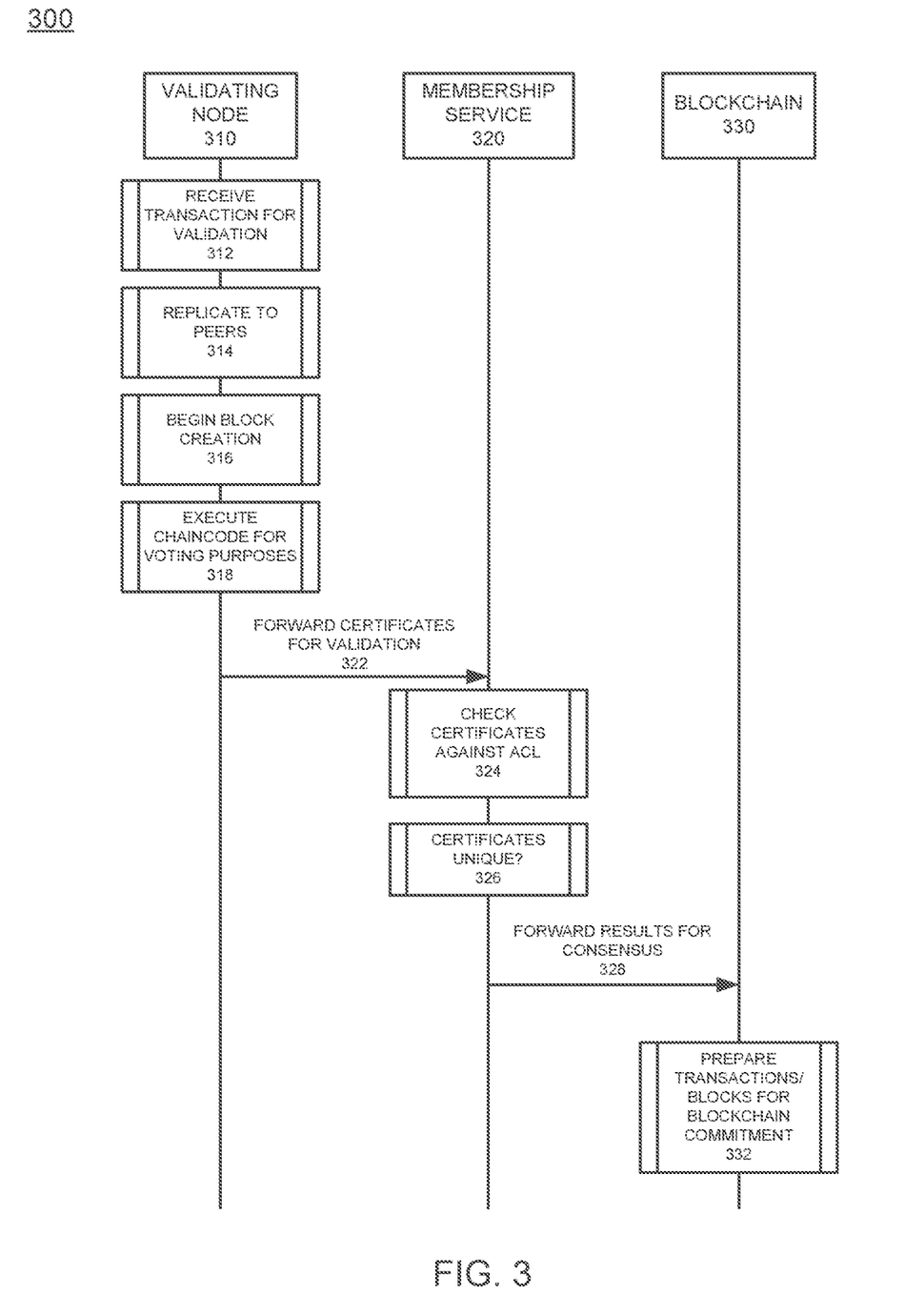
FIG. 3 illustrates a system messaging diagram for processing transaction validation and membership services, according to example embodiments.

FIG. 3 illustrates a system messaging diagram for processing transaction validation and membership services, according to example embodiments. Referring to FIG. 3, the system configuration 300 includes a set of nodes including a validating node 310, which may be one or more validating nodes of the blockchain, a membership service 320, which may be an application operating to assist with the application procedures, chaincode operation and other functions, and a blockchain 330 as the ledger and/or computing platform providing service to the ledger. The process may include receiving a transaction for validation 312, replicating the information to other peers 314, beginning a block creation cycle 316, executing a chaincode set of instructions for voting purposes 318 and communicating to membership services to provide valid certificates 322. The certificates are identified against an ACL 324 and a uniqueness 326 check is performed to identify duplicates or attempted spoofing of the vote. The results are forwarded for consensus 328 and the transaction/block information may be committed 332 in the blockchain 330.

Figure 4A:
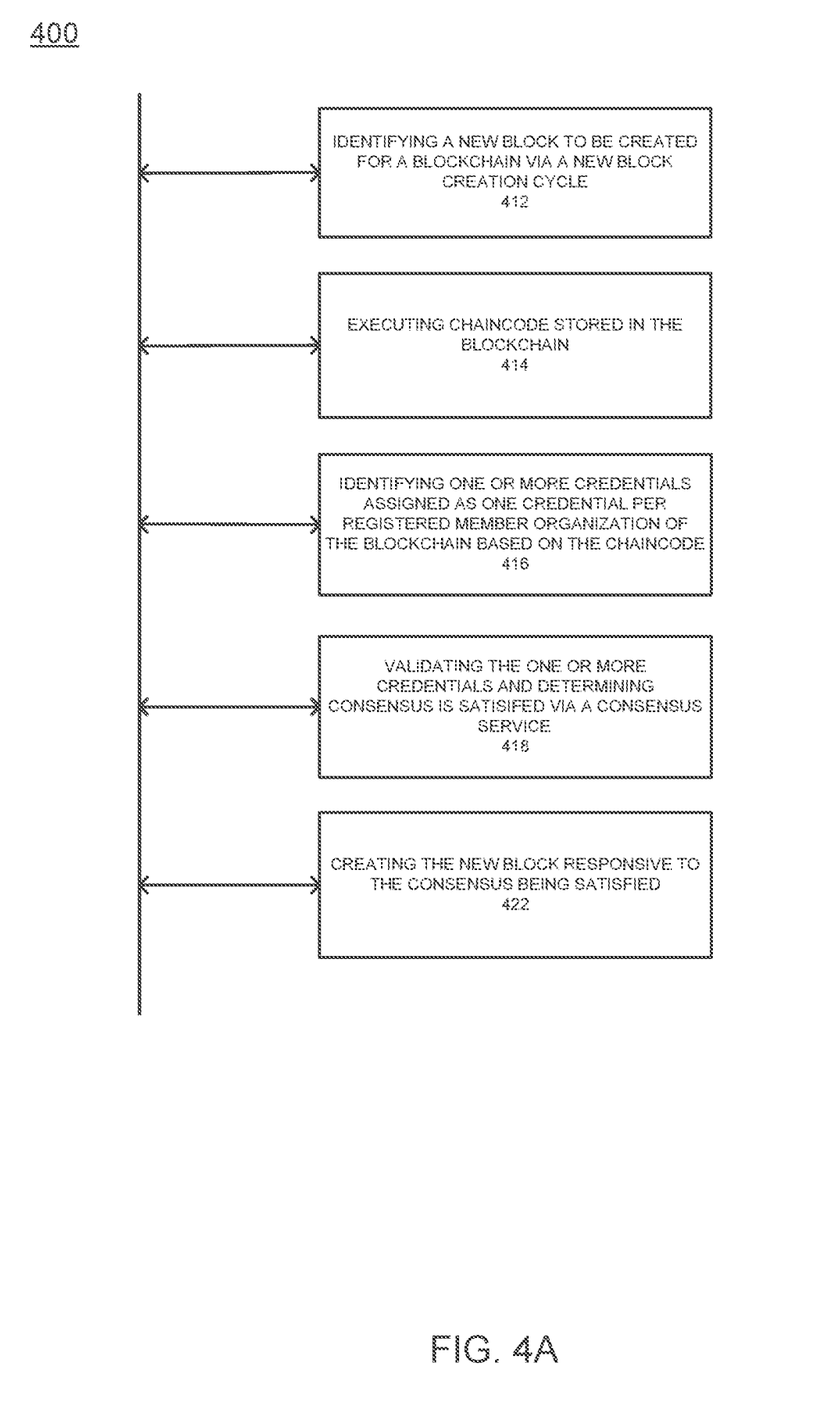
FIG. 4A illustrates a flow diagram of an example method of managing and processing transactions, according to example embodiments.

FIG. 4A illustrates a flow diagram of an example method 400 of managing and processing transactions, according to example embodiments. Referring to FIG. 4A, the method may include identifying a new block to be created for a blockchain via a new block creation cycle 412, executing chaincode stored in the blockchain 414, identifying one or more credentials assigned as one credential per registered member organization of the blockchain based on the chaincode 416, validating the one or more credentials and determining consensus is satisfied via a consensus service 418, and creating the new block responsive to the consensus being satisfied 422.

The chaincode identifies and references an access control list (ACL) used to identify the one or more credentials during the new block creation cycle. The method may also include accessing the ACL based on a chaincode instruction, and determining the one or more credentials received are associated with an authorized list of nodes based on the ACL, and also determining a threshold number of the one or more credentials are valid, and determining the consensus is valid responsive to determining the threshold number of the one or more credentials are valid. The method may further provide ordering a plurality of transactions for commitment to the new block, receiving a request to create the new block, requesting the one or more credentials from one or more of the authorized nodes responsive to receiving the request to create the new block, receiving the one or more credentials as a credential bundle, and comparing the credential bundle to the ACL, and also determining whether each credential in the credential bundle is unique via a credential examination, and forwarding results of the credential examination to the consensus service.

Figure 4B:
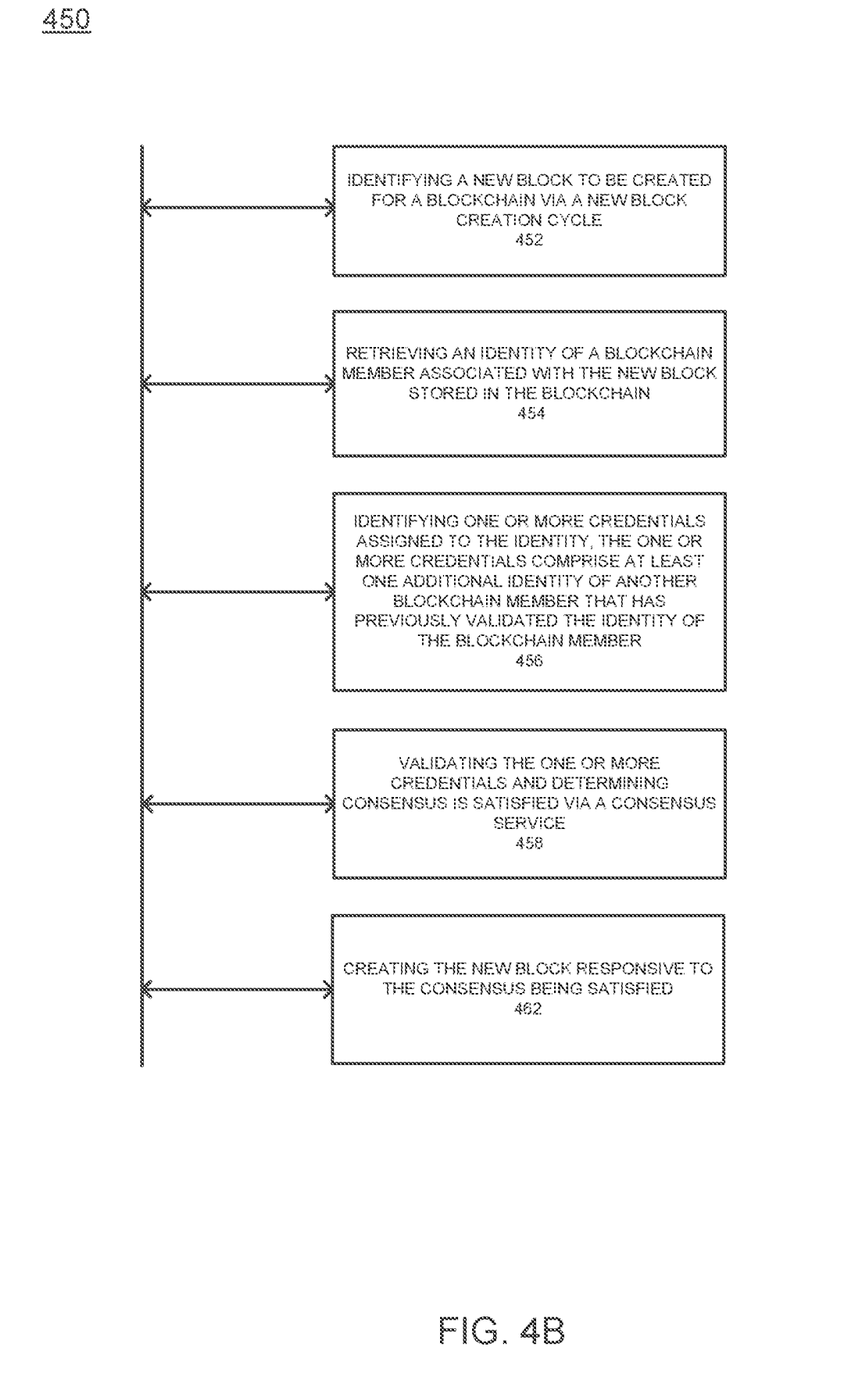
FIG. 4B illustrates another flow diagram of an example method of managing and processing transactions, according to example embodiments.

FIG. 4B illustrates another flow diagram of an example method of managing and processing transactions, according to example embodiments. Referring to FIG. 4B, the method 450 may include identifying a new block to be created for a blockchain via a new block creation cycle 452, retrieving an identity of a blockchain member associated with the new block stored in the blockchain 454, identifying one or more credentials assigned to the identity, the one or more credentials include at least one additional identity of another blockchain member that has previously validated the identity of the blockchain member 456, validating the one or more credentials and determining consensus is satisfied via a consensus service 458, and creating the new block responsive to the consensus being satisfied 462.

In addition to the blockchain block consensus model and the list of established entities, an entity chain may be used to store identity information for all members and associations between those members. The existence of a link between other members and the member seeking validation may provide adequate evidence needed for consensus to validate blocks from that member associated with the new block. The history of validation and linkage between members provides adequate information for processing the request or in this case a block for validation and commitment to the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
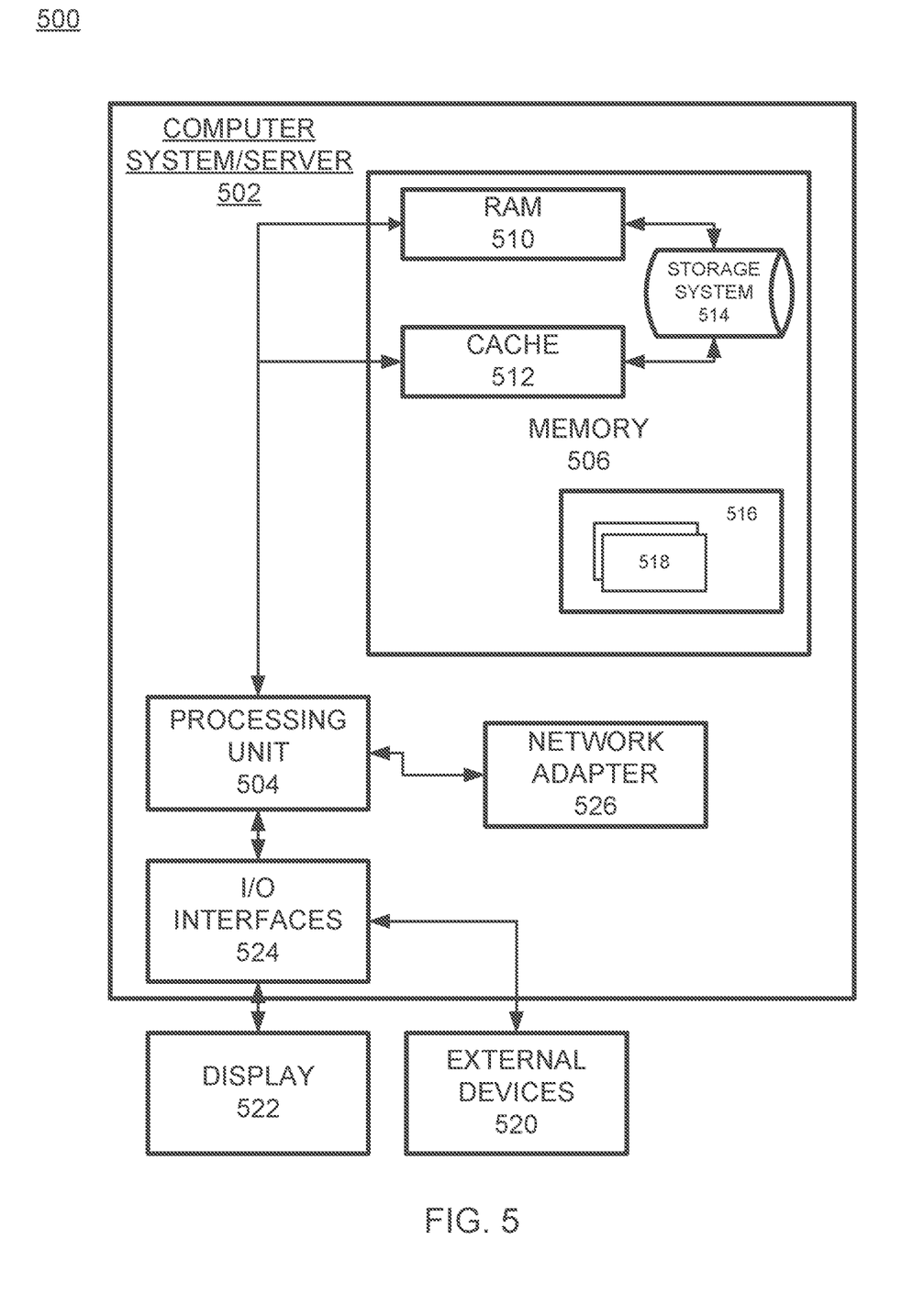
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a new block to be created for a blockchain via a new block creation cycle;
   executing chaincode stored in the blockchain;
   identifying a credential received from a blockchain node associated with a member organization of the blockchain based on the chaincode;
   performing a uniqueness check for the received credential which determines that the received credential is a duplicate of another credential received from a blockchain node of the same member organization;
   accumulating the duplicate credentials that are associated with the same member organization into one accumulated voting credential;
   determining consensus of the new block is satisfied based on the accumulated voting credential; and
   creating the new block responsive to the consensus being satisfied;

wherein the uniqueness check comprises referencing an access control list (ACL) to identify credentials of the blockchain node that is associated with the same member organization.

2. The method of claim 1, further comprising:
accessing the ACL based on a chaincode instruction; and determining the received credential is associated with an authorized list of nodes of the member organization based on the ACL.

3. The method of claim 1, further comprising: determining a threshold number of credentials are valid; and determining the consensus is valid responsive to determining the threshold number of the credentials are valid.

4. The method of claim 1, further comprising: ordering a plurality of transactions for commitment to the new block; receiving a request to create the new block; and requesting credentials from one or more authorized nodes responsive to receiving the request to create the new block.

5. The method of claim 1, further comprising: receiving the first credential within a credential bundle; and comparing the credential bundle to an access control list.

6. The method of claim 5, further comprising: determining whether each credential in the credential bundle is unique via a credential examination; and forwarding results of the credential examination to a consensus service.

7. An apparatus, comprising:
a processor configured to:
identify a new block to be created for a blockchain via a new block creation cycle; execute chaincode stored in the blockchain;
identify a first credential received as a first vote from a blockchain node associated with a member organization of the blockchain based on the chaincode;
perform a uniqueness check for the first credential which determines that a second credential is received as a second vote from another blockchain node of the same member organization;
accumulate the first and second votes of the first and second credentials that are associated with the same member organization into a single vote;
determine consensus of the new block is satisfied based on the accumulation of the first and second votes into a single vote; and
create the new block responsive to the consensus being satisfied;
wherein the uniqueness check comprises referencing an access control list (ACL) to identify credentials of blockchain nodes that are that are associated with the same member organization.

8. The apparatus of claim 7, wherein the processor is further configured to: access the ACL based on a chaincode instruction; and determine the first credential is associated with an authorized list of nodes of the member organization based on the ACL.

9. The apparatus of claim 7, wherein the processor is further configured to: determine a threshold number of credentials are valid; and determine the consensus is valid responsive to determination of the threshold number of the credentials are valid.

10. The apparatus of claim 9, wherein the processor is further configured to: order a plurality of transactions for commitment to the new block; receive a request to create the new block; and request credentials from one or more authorized nodes responsive to receiving the request to create the new block.

11. The apparatus of claim 7, wherein the processor is further configured to receive the first credential within a credential bundle; and compare the credential bundle to an access control list.

12. The apparatus of claim 11, wherein the processor is further configured to determine whether each credential in the credential bundle is unique via a credential examination; and forward results of the credential examination to a consensus service.

13. A non-transitory computer readable storage medium configured to store instructions that when executed cause a processor to perform: identifying a new block to be created for a blockchain via a new block creation cycle; executing chaincode stored in the blockchain; identifying a first credential received as a first vote from a blockchain node associated with a member organization of the blockchain based on the chaincode; performing a uniqueness check for the first credential which determines that credential is received as a second vote from another blockchain node of the same member organization; accumulating the first and second votes of the first and second credentials associated with the same member organization into a single vote; determining consensus of the new block is satisfied based on the accumulation of the first and second votes into a single vote; and creating the new block responsive to the consensus being satisfied;
wherein the uniqueness check comprises referencing an access control list (ACL) to identify credentials of blockchain nodes that are that are associated with the same member organization.

14. The non-transitory computer readable storage medium of claim 13, wherein the processor is further configured to perform: accessing the ACL based on a chaincode instruction; and determining the first credential is associated with an authorized list of nodes of the member organization based on the ACL.

15. The non-transitory computer readable storage medium of claim 13, wherein the processor is further configured to perform: determining a threshold number of credentials are valid; and determining the consensus is valid responsive to determining the threshold number of the credentials are valid.

16. The non-transitory computer readable storage medium of claim 13, wherein the processor is further configured to perform: ordering a plurality of transactions for commitment to the new block; receiving a request to create the new block; and requesting credentials from one or more authorized nodes responsive to receiving the request to create the new block.

17. The non-transitory computer readable storage medium of claim 13, wherein the processor is further configured to perform: receiving the first credential within a credential bundle; comparing the credential bundle to an access control list; determining whether each credential in the credential bundle is unique via a credential examination of the access control list; and forwarding results of the credential examination to a consensus service.

* * * * *